(No Model.)
C. H. SIMMONS.
SUPPORT FOR ELECTRIC LIGHTS AND CONDUCTORS.
No. 429,067.   Patented May 27, 1890.
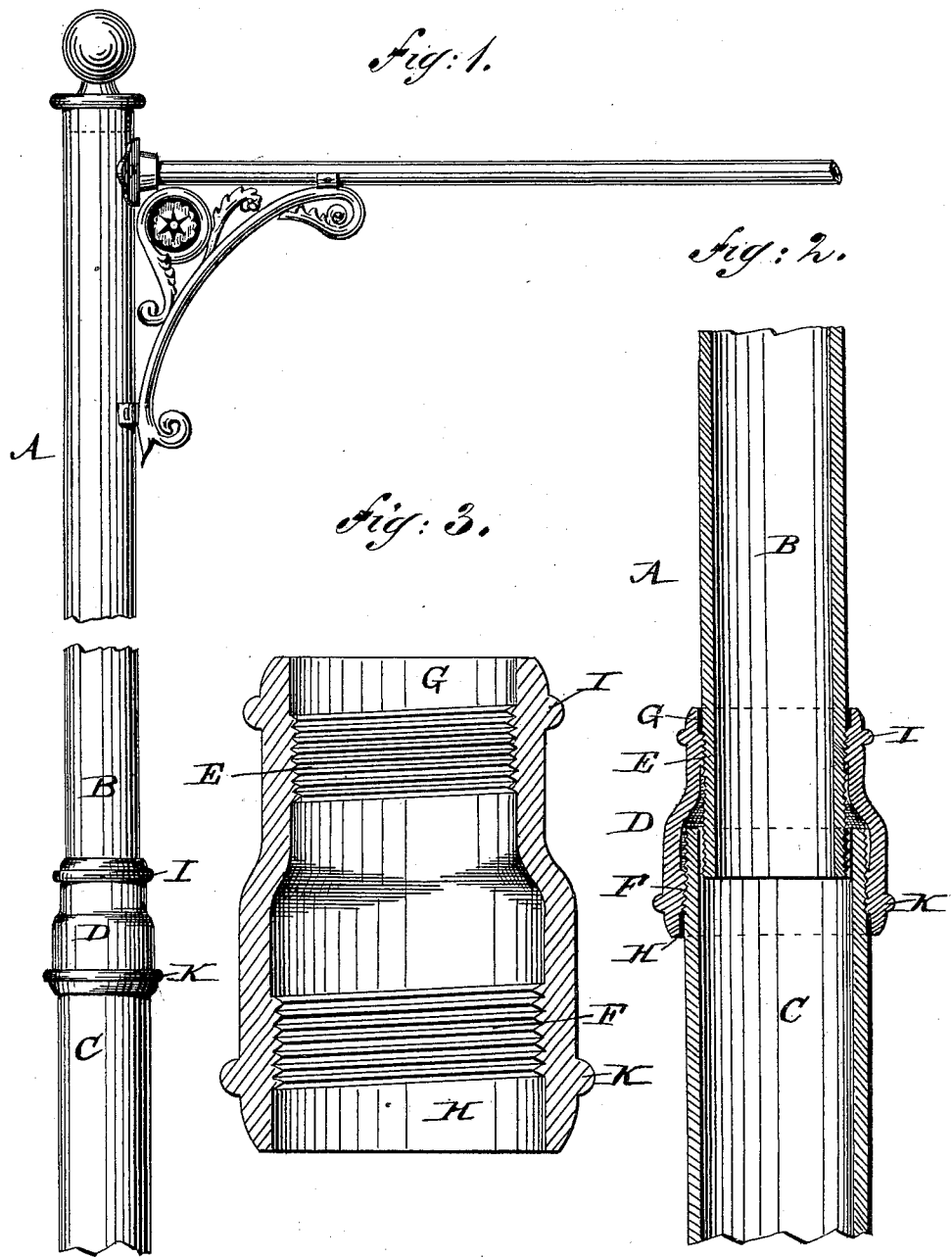

UNITED STATES PATENT OFFICE.

CHARLES H. SIMMONS, OF BROOKLYN, NEW YORK.

SUPPORT FOR ELECTRIC LIGHTS AND CONDUCTORS.

SPECIFICATION forming part of Letters Patent No. 429,067, dated May 27, 1890.

Application filed November 29, 1889. Serial No. 331,947. (No model.)

*To all whom it may concern:*

Be it known that I, CHARLES H. SIMMONS, a citizen of the United States, residing in the city of Brooklyn, county of Kings, and State of New York, have invented a certain new and useful Improvement in Supports for Electric Lights and Conductors, of which the following is a specification.

This invention relates to the construction of supporting poles or posts expressly adapted for electric lights and conductors, of sections of iron or other metal pipe joined together. It has been the ordinary practice to make these poles or posts of pipe-sections of successively smaller diameter toward their upper ends to give the requisite taper, connected by common reducing-couplers, which were generally screwed on the pipe; but in some cases, to avoid the weakness at the points of greatest strain on the pipe at the ends of the couplers caused by the thread cut on the pipe, were sweated on the pipe, which, however, was a tedious and expensive method.

My invention, by which these disadvantages are overcome, consists of a screw-coupler or sleeve, the end threads of which start some distance from the ends thereof, leaving at the ends an unthreaded inner surface which, when the coupler is screwed on the pipe, bears upon an unthreaded and hence strong portion of the pipe and supports its weakest places—the junctions of the threaded and unthreaded portions — which are further strengthened by exterior peripheral beads formed around the coupler at said junctions.

In order that my invention may be fully understood I shall first describe in detail the mode in which the same may be carried into effect, and then point out its distinctive features in the claims.

Reference is to be had to the accompanying drawings, forming a part of this specification, in which—

Figure 1 is an elevation of part of an electric-light support the pole of which is constructed according to my invention. Fig. 2 is an enlarged longitudinal sectional view of said pole in part. Fig. 3 is an enlarged longitudinal sectional view of the coupler of the same.

Like letters of reference designate corresponding parts in the various figures.

The pole A of this support is formed of, by preference, iron pipe-sections B C of different diameter, threaded externally on and for a short distance from their ends, and a preferably wrought-iron reducing-coupler D, having interior threads E F cut near the ends to fit the end threads of the pipe-sections B C respectively, said threads E and F each starting some distance from the respective end of the coupler, so as to leave unthreaded interior bearing-surfaces G H at the ends. The pipe-sections B C being screwed into the respective ends of the coupler to the ends of the threads on the pipe-sections, the uncut and hence strongest portions of the pipe-sections beyond the threads will have a bearing against the uncut surfaces G H of the coupler, and the weakest points of the sections—*i. e.*, at the junctions of the cut and uncut portions—thus be strongly supported. Further, peripheral beads I K are formed around the outside of the coupler at the junctions of the threaded portions E F and unthreaded portions G H thereof, so as to give the coupler the needed strength at the points of greatest strain. The smaller pipe-section B is here shown also as extending, when screwed home, within the larger pipe-section C, so as to still further strengthen the joint.

The beads I K serve a further purpose in ornamenting the whole and to a certain extent concealing the difference in size of the two pipe-sections.

A pole or post thus constructed may be made of any desired size and height by increasing the size and number of the pipe-sections, and can be quickly put together, while the maximum strength is obtained.

What I claim as my invention is—

1. In a pole or post, the combination, with a coupler having an interior thread starting some distance from its end, an unthreaded interior surface at its end, and an exterior peripheral bead surrounding the junction of the threaded and unthreaded portions, of a pipe-section having a threaded end screwed into the coupler to the end of its thread, substantially as described.

2. The pipe-coupler herein shown and described, formed with interior threads starting some distance from its ends, unthreaded interior end surfaces and exterior peripheral beads at the junctions of the threaded and unthreaded portions, substantially as described.

CHAS. H. SIMMONS.

Witnesses:
H. J. ECKHOFF,
EDW. GUNDERSON.